United States Patent
Xu et al.

(10) Patent No.: US 10,970,253 B2
(45) Date of Patent: Apr. 6, 2021

(54) FAST DATA DEDUPLICATION IN DISTRIBUTED DATA PROTECTION ENVIRONMENT

(71) Applicant: INTERNATIONAL BUSINESS MACHINES CORPORATION, Armonk, NY (US)

(72) Inventors: Xin Xu, Beijing (CN); Jing Wen, Beijing (CN); Yu Meng Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 16/158,991

(22) Filed: Oct. 12, 2018

(65) Prior Publication Data

US 2020/0117724 A1     Apr. 16, 2020

(51) Int. Cl.
| | |
|---|---|
| *G06F 16/174* | (2019.01) |
| *H04L 9/06* | (2006.01) |
| *G06F 16/178* | (2019.01) |
| *G06F 16/903* | (2019.01) |

(52) U.S. Cl.
CPC ........ *G06F 16/1748* (2019.01); *G06F 16/178* (2019.01); *G06F 16/903* (2019.01); *H04L 9/0643* (2013.01)

(58) Field of Classification Search
CPC .................................................. G06F 16/1748
USPC ......................................................... 707/692
See application file for complete search history.

(56) References Cited

U.S. PATENT DOCUMENTS

| | | | |
|---|---|---|---|
| 7,774,645 B1 * | 8/2010 | Clark .................. | G06F 11/1666 711/147 |
| 8,930,306 B1 | 1/2015 | Ngo et al. | |
| 8,983,952 B1 | 3/2015 | Zhang et al. | |
| 2007/0260693 A1 * | 11/2007 | Cardone ................. | H04L 51/28 709/206 |
| 2009/0265399 A1 * | 10/2009 | Cannon ............... | G06F 16/1748 |
| 2012/0158664 A1 * | 6/2012 | Anglin .................. | G06F 16/174 707/675 |
| 2014/0233366 A1 | 4/2014 | Prahlad et al. | |
| 2016/0132523 A1 | 5/2016 | Traeger | |
| 2016/0162218 A1 | 6/2016 | Callaway et al. | |
| 2016/0306820 A1 | 6/2016 | Agrawal et al. | |
| 2017/0262347 A1 * | 9/2017 | Dornemann ............ | G06F 11/14 |
| 2020/0042399 A1 * | 2/2020 | Kuang ................ | G06F 11/1458 |

* cited by examiner

*Primary Examiner* — Hung T Vy
(74) *Attorney, Agent, or Firm* — Griffiths & Seaton PLLC

(57) ABSTRACT

Embodiments for data deduplication in a data deduplication environment by one or more processors. A data extent, existing on a remote server instance, may be denoted as a virtual base extent to eliminate redundant transfer of the data extent for fast data deduplication in a distributed data protection environment. A synchronization operation is performed to replace the virtual base extent with actual data via a replication process.

15 Claims, 9 Drawing Sheets

400

| EXTENT ID | INSTANCE ID | SHA VALUE |
|---|---|---|
| EXTENT 1 | INSTANCE 1 | SHA1 |
| EXTENT 2 | INSTANCE 2 | SHA2 |
| EXTENT 3 | INSTANCE 2 | SHA3 |
| EXTENT 4 | INSTANCE 1 | SHA4 |

| CHUNK ID | INSTANCE ID | SHA VALUE |
|---|---|---|
| EXTENT 1 | INSTANCE 1 | SHA1 |
| EXTENT 2 | INSTANCE 2 → INSTANCE 1 | SHA2 |
| EXTENT 3 | INSTANCE 2 → INSTANCE 1 | SHA3 |

FIG. 4B

FAST DATA DEDUPLICATION IN DISTRIBUTED DATA PROTECTION ENVIRONMENT

BACKGROUND OF THE INVENTION

Field of the Invention

The present invention relates in general to computing systems, and more particularly to, various embodiments for fast data deduplication in distributed data protection environment by one or more processors.

Description of the Related Art

In today's society, computer systems are commonplace. Computer systems may be found in the workplace, at home, or at school. As computer systems become increasingly relied upon, convenient, and portable, the Internet has grown exponentially. Now more than ever, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

Various embodiments for optimizing data deduplication in a computing environment by one or more processors are provided. In one embodiment, by way of example only, a method for fast data deduplication in distributed data protection environment computing environment, again by one or more processors, is provided. A data extent existing on a remote server instance as a virtual base extent to eliminate redundant transfer of the data extent for fast data deduplication in a distributed data protection environment. A synchronization operation is performed to replace the virtual base extent with actual data via a replication process.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4A is diagram depicting a table scheme for fast data deduplication in distributed data protection environment according to an embodiment of the present invention;

FIG. 4B is diagram depicting a table scheme change during a synchronization process for fast data deduplication in distributed data protection environment according to an embodiment of the present invention;

DETAILED DESCRIPTION OF THE DRAWINGS

Figure 1:
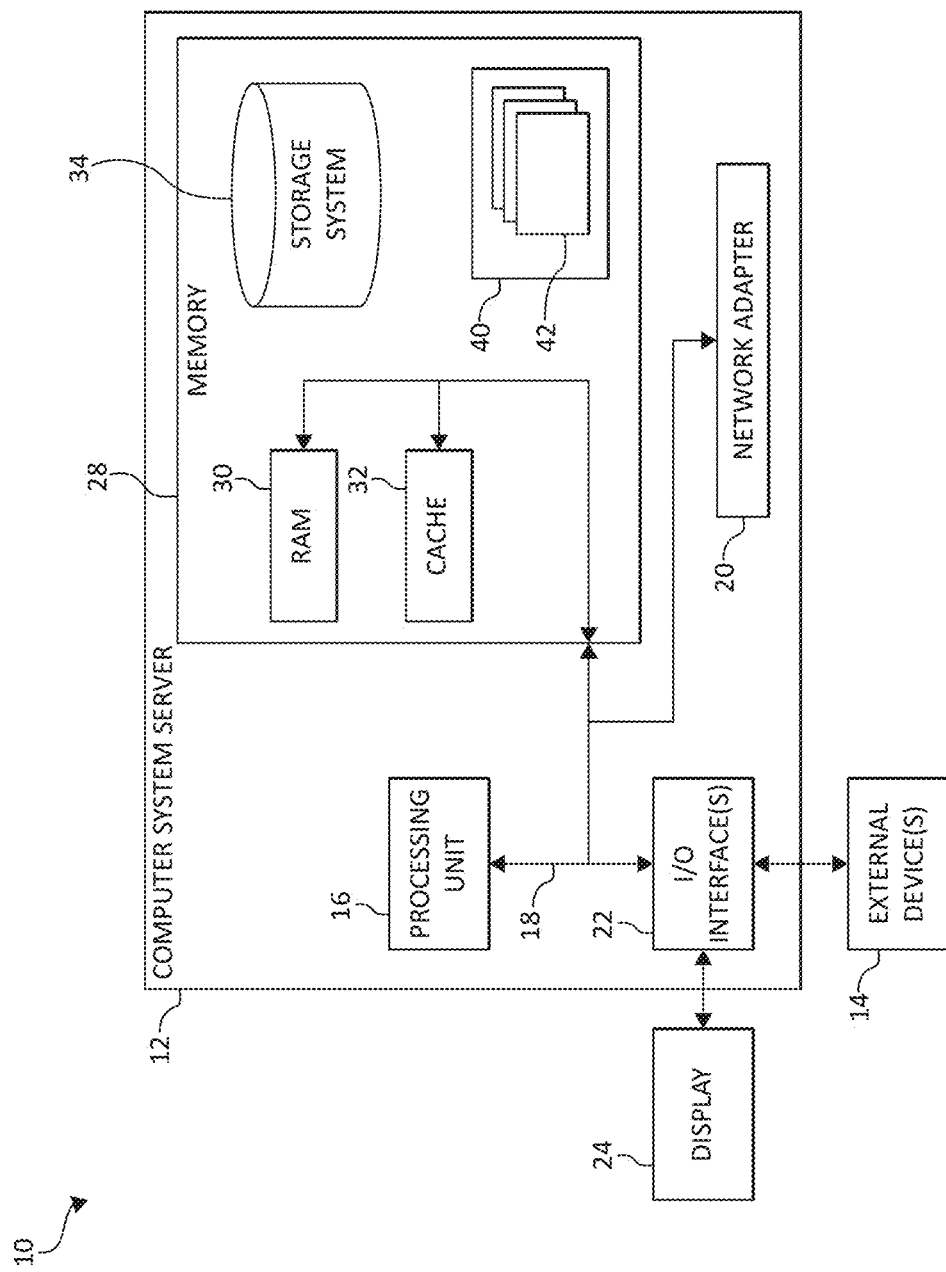
FIG. 1 is a block diagram depicting an exemplary computing node according to an embodiment of the present invention.

Large amounts of data have to be processed daily and the current trend suggests that these amounts will continue being ever-increasing in the foreseeable future. Deduplication is a storage saving technique that is highly successful in enterprise storage. Data deduplication systems are increasingly utilized because they help reduce the total amount of physical storage that is required to store data. This reduction is accomplished by ensuring that duplicate data is not stored multiple times. By removing duplicates within and across files. The idea underlying a deduplication system is to exploit the fact that large parts of the available data is copied again and again and forwarded without any change, by locating repeated data and storing only its first occurrence. Data entrusted to a deduplicating system often times is required to be exported and/or backed up to a different site. Deduplication reduces bandwidth and storage capacities. For example, for workloads with inherent repetitions, deduplication is reported to reduce capacity with ratios ranging between 1:2 and 1:50 in backup environments, and up to 1:10 in virtual machine environments.

Deduplication often involves hashing data segments to identify duplicate data segments, then replacing an identified duplicate data segment with a smaller reference such as a pointer, or the like. In this manner, typically one copy of a duplicated data segment is saved and indexed as a reference, thus allowing other instances of the data segment to be deleted and replaced with a reference or pointer to the indexed data segment. By removing duplicated data in this fashion, storage efficiency can be improved, and considerable computing space can be freed up within a data storage system.

In a distributed data protection environment, multiple data protection server instances may be deployed to manage different data backups for workload balance or disaster recovery consideration. However, current deduplication only occurs at the level of a single server instance. The redundant data can still be stored onto the server instance even though it already exists in other instances, which can cause unnecessary data transfer between a data protection client and server thereby slowing down the data backup speed. However, if multiple instances are assembled together as one unified pool for data deduplication, single server instance independence will be lost and a significant amount of complexity will be introduced to maintain such a big deduplicated pool.

Accordingly, the present invention provides a solution for fast data deduplication in distributed data protection environment. That is, fast data deduplication is enabled by a data extent, which exists on a remote server instance, being denoted/designated as a virtual base extent (e.g., a virtual data extent) to eliminate redundant transfer of the data extent for deduplication in a distributed data protection environment. A synchronization operation is performed to replace the virtual base extent with actual data via a replication process.

In an additional aspect for fast data deduplication, during a data backup operation, backup data may be split into small data extents (e.g., 256 kilobyte "KB" to 2 Megabyte "MB"), a data protection client may query a connected server instance to attempt to identify/find redundancy (e.g., "possible" data redundancy), and only new data extents will be backed up. When a data protection client queries for the redundancy data extents, the connected server instance not only searches from a local instance but also queries other server instances to check whether or not the data extents exist in other server instances. In the event the data extents are not locally found (e.g., no data extents are located on the local server instance), the data extents are considered (e.g., "denoted") as virtual base extents if the data extents exist in another server instance. A table schema may be created/used to track which server instance each virtual base extents originates/comes from when that data is backed up to data protection environment from a client.

It should be noted that since the virtual base extents will not be backed up during a backup operation phase, the de-duplication may occur in cross instance scale (e.g., deduplication occurs in a level of multiple server instances) so a client backup window can be further reduced. After the backup operation is finished, a synchronization process may be triggered between data protection servers using a server-to-server communication operation, which is based under fast data transfer network, such as, for example, a storage area network "SAN." The virtual data extents, that are located in remote instances, may be returned/sent back to a local instance and replaced with real data by means of replication. Thus, different data protection servers may retain independency. If a client retrieval operation (e.g., from a local instance) occurs after synchronization process, all of the client data is retrieved from a local instance. If client data retrieval occurs prior to completion of a synchronization process, the designated virtual data extents, which are located in a remote instance, are first retrieved and replaced with real data and then sent back to a client as a complete/whole object.

In this way, compared to current data deduplication operations, the present invention provides for significant reduction to a backup window as less data is required to be sent/transferred across a network but also keeps the independence of each data protection server instance in a data protection environment. Thus, the present invention provides tremendous benefit to data protection users given the increasing need for data protection while also retaining the same flexibility of single instance data deduplication by replicating data around to fill up the empty virtual base extents.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
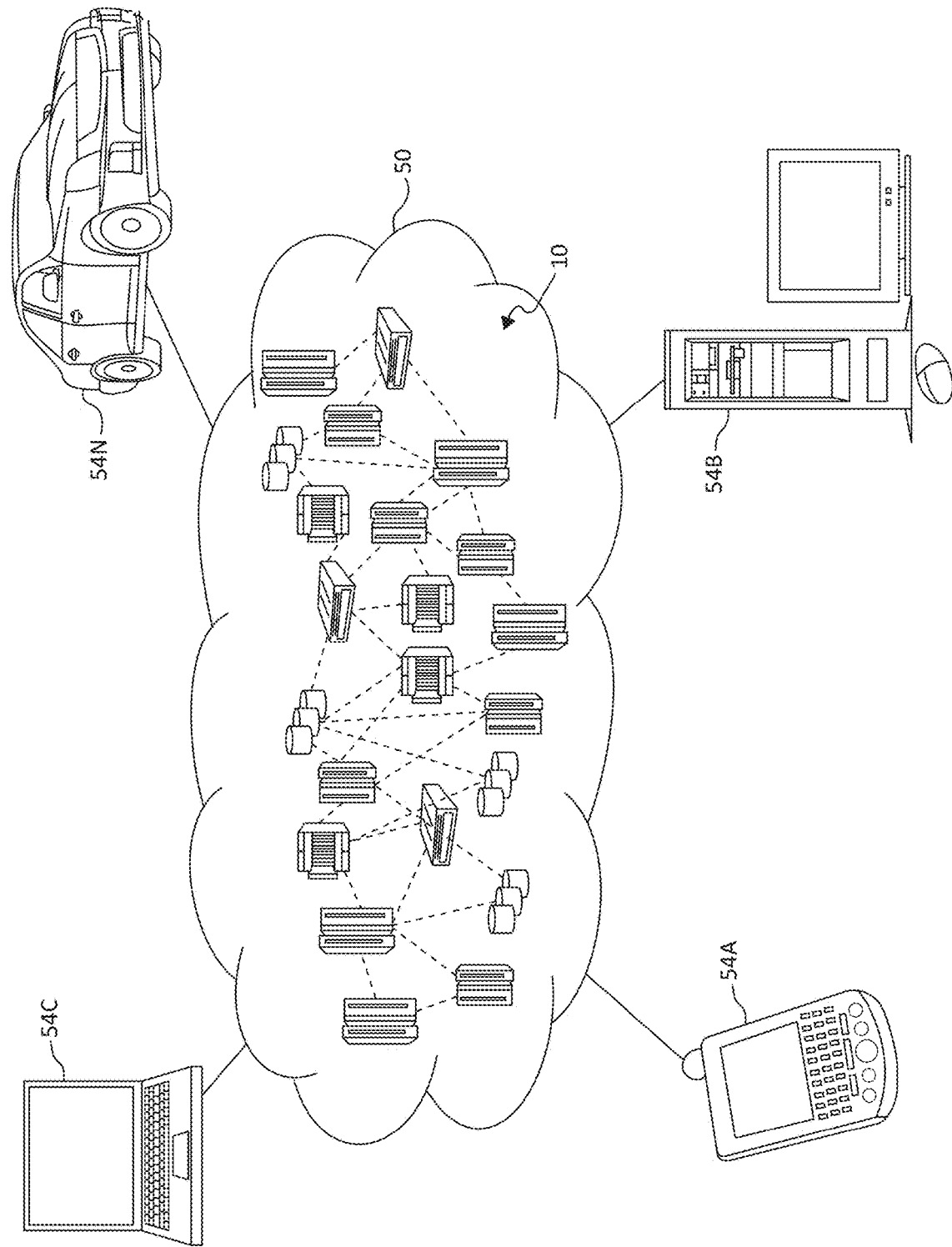
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
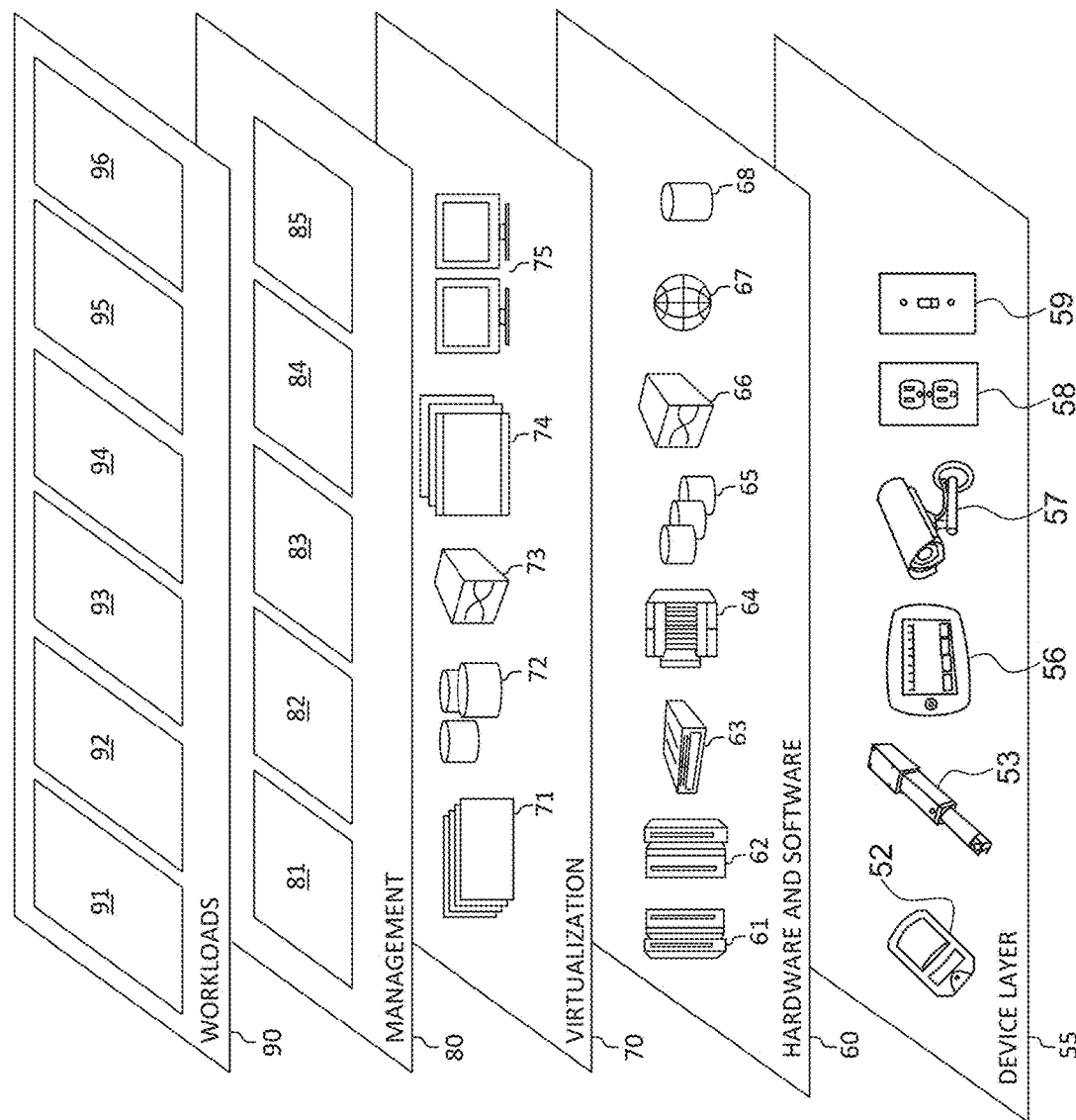
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for fast data deduplication. In addition, workloads and functions 96 for fast data deduplication may include such operations as data analytics, data analysis, and as will be further described, notification functionality. One of ordinary skill in the art will appreciate that the workloads and functions 96 for fast data deduplication may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously indicated, the present invention provides a solution for fast data deduplication in distributed data protection environment. In one aspect, the present invention provides for server-to-server communication in distributed data protection environment that may be utilized for fast data deduplication mechanism, which not only reduces data transferred across a network but also keeps the independence of each data protection server instance.

A table schema 400 (see FIG. 4A-4B) may be created to track which server instance virtual base extents originates/comes from when data is backed up in a data protection environment from client. A synchronization process (e.g., a follow-on synchronization process) is performed to replace virtual base extents with actual data by means of replication. Based on where the virtual base extents are located, actual data may be restored to a client by coordinating and using different servers to form complete objects in a local server instance. That is, if a virtual base extent exists in a remote instance and a client needs to restore (e.g., immediately restore) data in the local instance, a synchronization operation/process may be provided to replace the virtual base extend with actual data. Compared to current data deduplication mechanisms, aspects of the present invention significantly reduce a backup time window as less data is required to be sent across a network in a data protection environment.

Thus, data protection users are provided with optimized and faster data deduplication for the ever increasing data that needs to be protected each day. In addition, the present invention retains the same flexibility of single instance data deduplication by replicating data to a server instance by completing/filling-up designated virtual base extents on a local server instance that are incomplete (e.g., empty).

As illustrated in FIG. 4A-4B, table schema 400 (e.g., tracking table) is created to track which server instance each virtual base extents originates/comes from when that data is backed up in a data protection environment from a client. That is, table schema 400 of FIGS. 4A-4B are for tracking where virtual data extents are stored in different server instances.

The table schema 400 may be in a database of a server instance (e.g., a local server instance in a multiple server instance computing environment) and may be used to identify, track, and/or remember where virtual data extents are stored. The table schema 400 may include at least three fields such as, for example, an extend identifier ("ID"), an instance ID, and a secure hash algorithm (SHA) value. Each row on the table schema 400 can represent a virtual data extent (e.g., a virtual base extent) in a data protection server. For example, the table schema 400 may show extent 1 having an instant ID as "instance 1" and a SHA value as "SHA 1," extent 2 having an instant ID as "instance 2" and a SHA value as "SHA 2," extent 3 having an instant ID as "instance 3" and a SHA value as "SHA 3," and extent 4 having an instant ID as "instance 4" and a SHA value as "SHA 4."

The extent ID is a unique identifier for each data extent in a single data protection server. The instance ID is a unique identifier for each data protection server instance. The instance ID is used to remember which server instance the virtual data extent originates/comes from (e.g., which is the source server instance). The SHA value is determined/calculated based on the extent's data. The SHA value is unique for each data extent. Extents that have the same SHA value means the extents are duplicate extents. A data protection server may use the SHA value to identify virtual base extents between server instances during synchronization process.

The synchronization process may search and replace all the virtual base extents with real data by means of replication. A local data protection server instance may search from a database of the local data protection server instance and obtain a list of virtual data extents that are located in remote instances. Thus, the table scheme 400 of FIG. 4B illustrates a change during a synchronization process for fast data deduplication in distributed data protection environment. In other words, table scheme 400 of FIG. 4B depicts virtual extent data being replaced by real chunk data from a remote server instance during a synchronization process. For example, as illustrated, "extent 2" may have an instance ID changed from instance 2 to instance 1 and "extent 3" may have an instance ID changed from instance 2 to instance 1.

Figure 5:
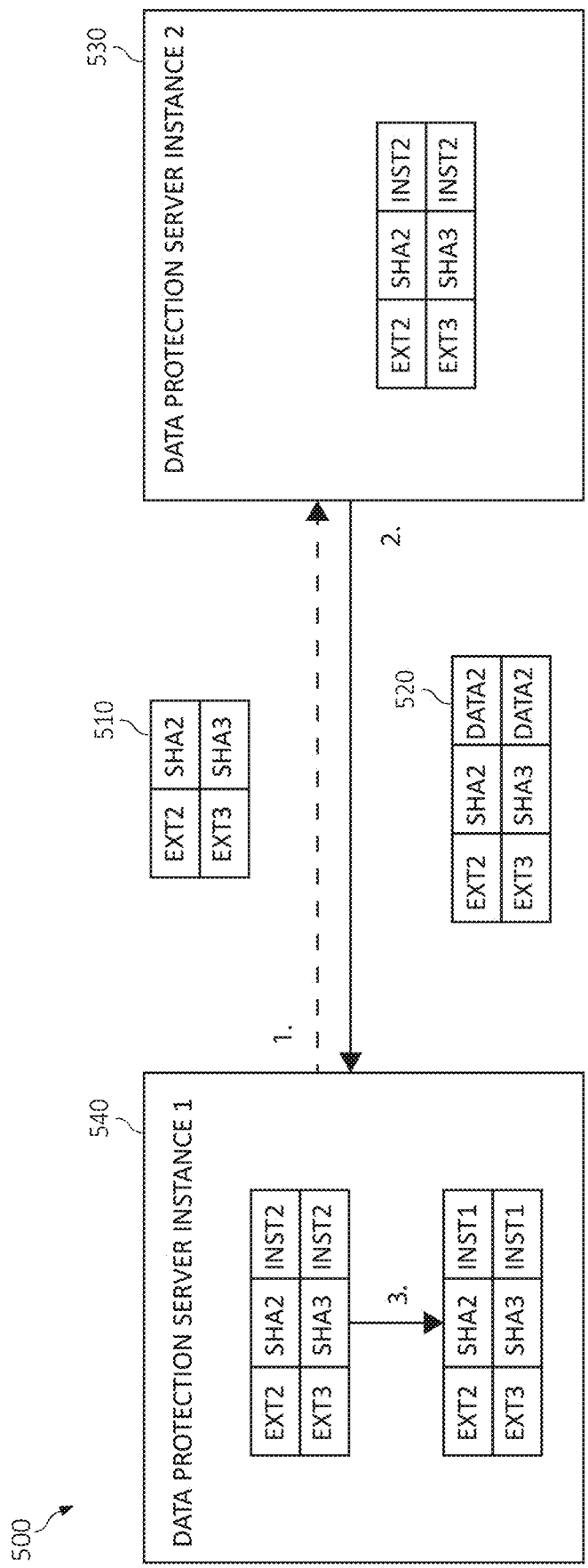
FIG. 5 is an additional block diagram depicting a synchronization process for fast data deduplication in distributed data protection environment according to an embodiment of the present invention.

Turning now to FIG. 5, block diagram 500 depicts a synchronization process for fast data deduplication in distributed data protection environment. Said differently, block diagram 500 depicts a synchronization process for fast data deduplication between a local protect server instance 540 (e.g., data protection server instance 1) and a remote protect server instance 530 (e.g., data protection server instance 2). In one aspect, one or processing units (e.g., processing unit 12 and memory 28 of FIG. 1) may be employed in block diagram 500 of FIG. 5 to perform various computational, data processing, storage and other functionality in accordance with various aspects of the present invention.

The synchronization process be initiated and/or started for each involved remote instance. For example, a list of virtual data extents 510 (e.g., the list including extent 2 "ext2" and extent 3 "ext3") that includes the SHA values (e.g., SHA2 for extent 2 and SHA3 for extent 3) may be sent from the local protect server instance 540 (e.g., data protection server instance 1) to the remote protect server instance 530 (e.g., data protection server instance 2). Real chunk data (e.g., data 2 of extent 2 and data 3 of extent 3) may be sent from the remote protect server instance 530 back to local instance 540. In a local instance, the data may be saved for all extents (e.g., extents 2 and extents 3), and the extents may be updated in a location in a database.

More specifically, in step 1) the local protect server instance 540 (e.g., data protection server instance 1) may send a synchronization request chunk list, including a SHA value, to the remote protect server instance 530 (e.g., data protection server instance 2). In step 2) a real data chunk may be sent from the remote protect server instance 530 to the local protect server instance 540. In step 3), in the local protect server instance 540, the data may be saved for all extents and the extents location may be saved in a database.

Figure 6:
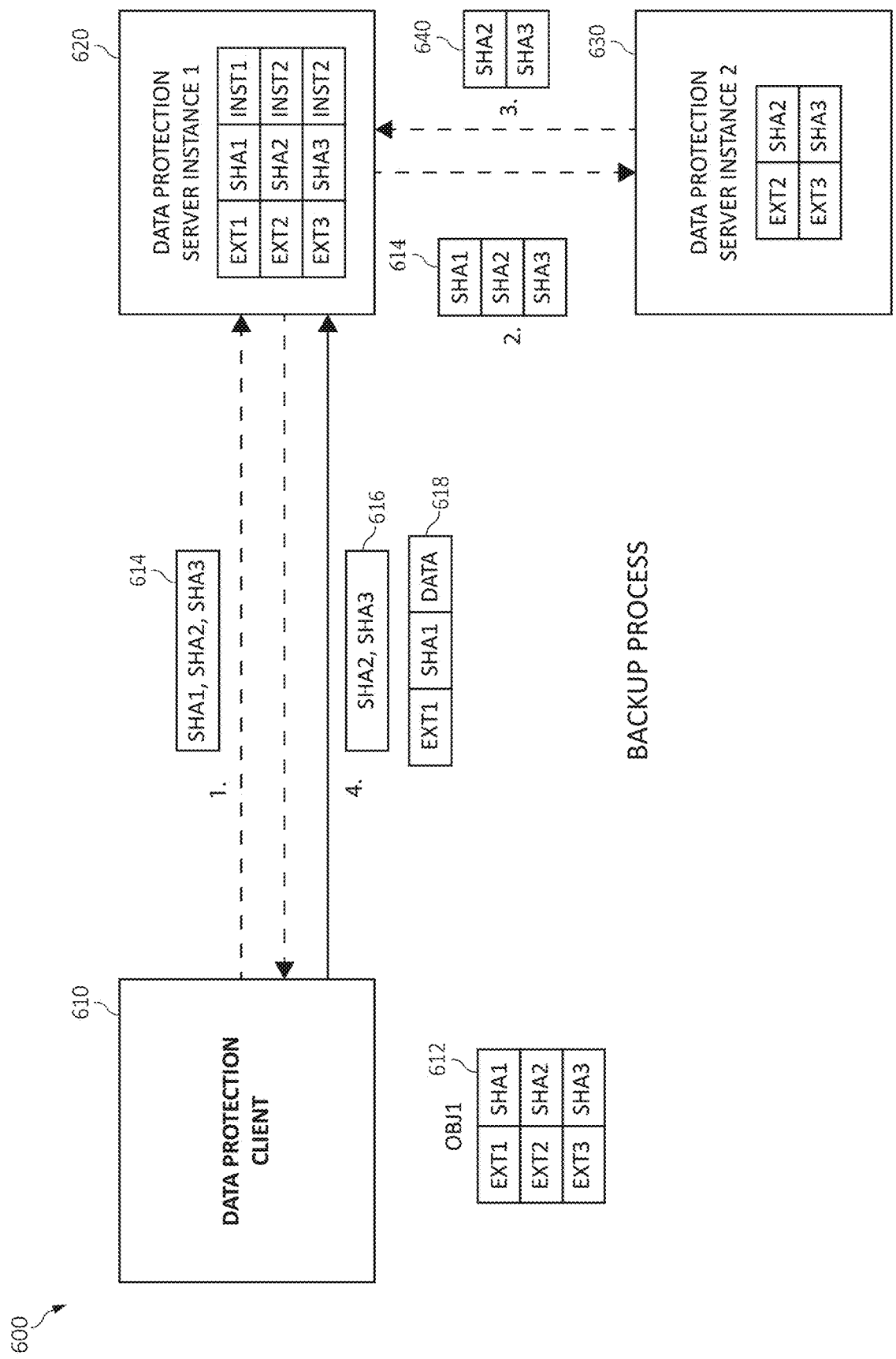
FIG. 6 is an additional block diagram depicting a backup process for fast data deduplication in distributed data protection environment according to an embodiment of the present invention.

Turning now to FIG. 6, block diagram 600 illustrates a backup process for fast data deduplication in distributed data protection environment. In one aspect, one or processing units (e.g., processing unit 12 and memory 28 of FIG. 1) may be employed in block diagram 600 of FIG. 6 to perform various computational, data processing, storage and other functionality in accordance with various aspects of the present invention.

A backup process using the fast deduplication operation of the present invention may be performed as follows. In step 1), a data protection client 610 may split data to be backed up into small data extents 612 (e.g., object 1 "obj1") on local instance 620 (e.g., data protection server instance 1). That is, data protection client 610 may send all SHA values 614 for each data extents needed to be backed up to the local instance 620. Also, the data protection client 610 may calculate the SHA value 614 (e.g., SHA1, SHA2, SHA3) for each data extents to be backed up.

In step 2), the local instance 620 (e.g., a local protect server) may query those requesting data extents from a remote server instance 630 (e.g., a remote server instance) if those data extents do not exist on the local instance 620. That is, for each data extent (e.g., extent 1, extent 2, and extent 3), the SHA values 614 may be sent to a remote server instance 630 (e.g., a connected data protection server instance 2) to determine whether the data extents already exists. Thus, the local instance 620 (e.g., data protection server instance 2 "local protect server")) may compare all requesting SHA's 614 (from the data protection client 610) with records of a local server database in the local instance 620 to determine whether or not all the data extents exist the local instance 620, and then send the SHA values 614 to remote server instance 630. Said differently, the local instance 620 (e.g., a local protect server) may compare the SHA values 614 with the local server database in the local instance 620 and may query the remote server instance 630 if the data extents do not reside locally on the local instance 620. Since all the SHA values 614 (e.g., SHA1, SHA2, SHA3) do not exist in the local instance 620, the SHA values 614 may be sent to remote server instance 630 to determine whether the data extents already exists.

In step 3), the query result (e.g., SHA values 640 such as, for example, SHA2 and SHA3), which may include the SHA values for the virtual base extents, may be sent back from the remote server instance 630 and store the remote location of the remote server instance 630 in the local instance 620 as virtual base extents. That is, the remote server instance (630) may send the query result 640 to the local instance 620 to indicate which data extents exists (e.g., SHA2 and SHA3) in the remote server instance 630.

In step 4), the local instance 620 may send SHA values 616 (e.g., SHA2, SHA3) back to the data protection client 610, which suggests the SHA values 616 (e.g., SHA2, SHA3) already exist in remote server instance 630. Thus, only non-existed data extents 618 (e.g., extent 1 "ext 1," SHA1, data) will be sent to the local server instance 620.

Figure 7:
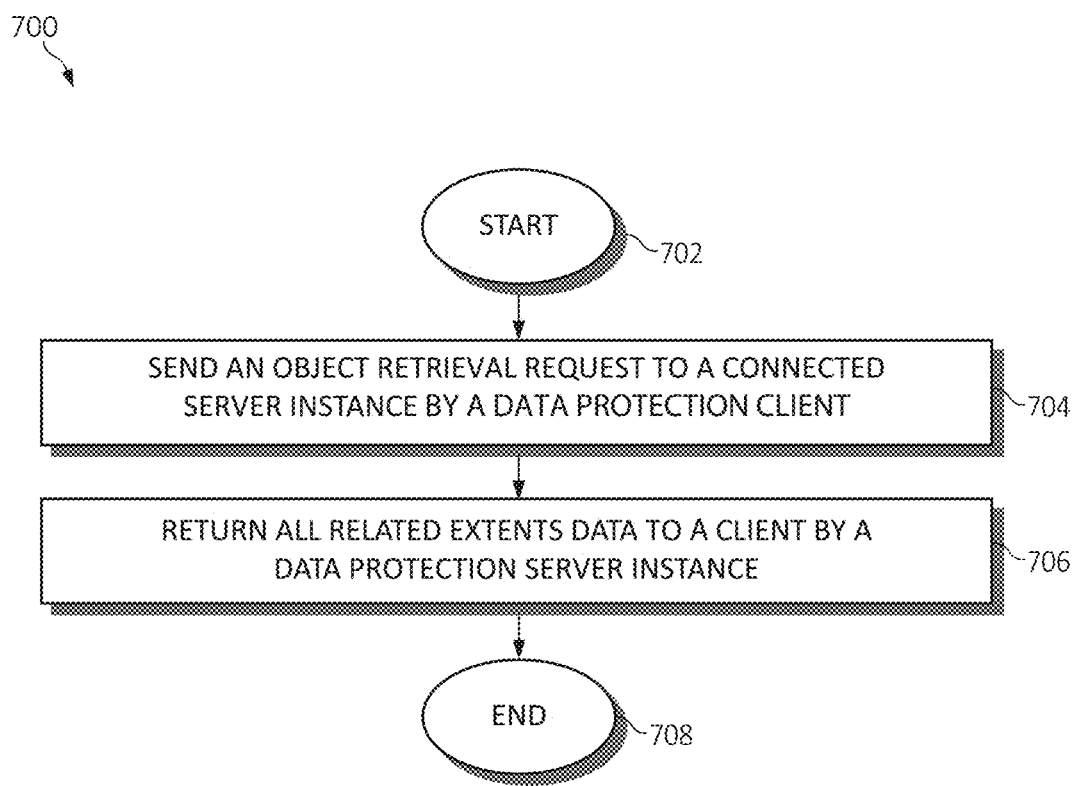
FIG. 7 is a flowchart diagram depicting an exemplary method for retrieving data after a data synchronization operation by one or more processors, again in which aspects of the present invention may be realized.

Turning now to FIG. 7, a method 700 for retrieving data after data synchronization in a computing environment by one or more processors is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

A data protection client may send an object retrieval request to a connected server instance, as in block 704. A data protection server instance may send back all related extents data to client, as in block 706. The functionality 700 may end, as in block 708.

Figure 8:
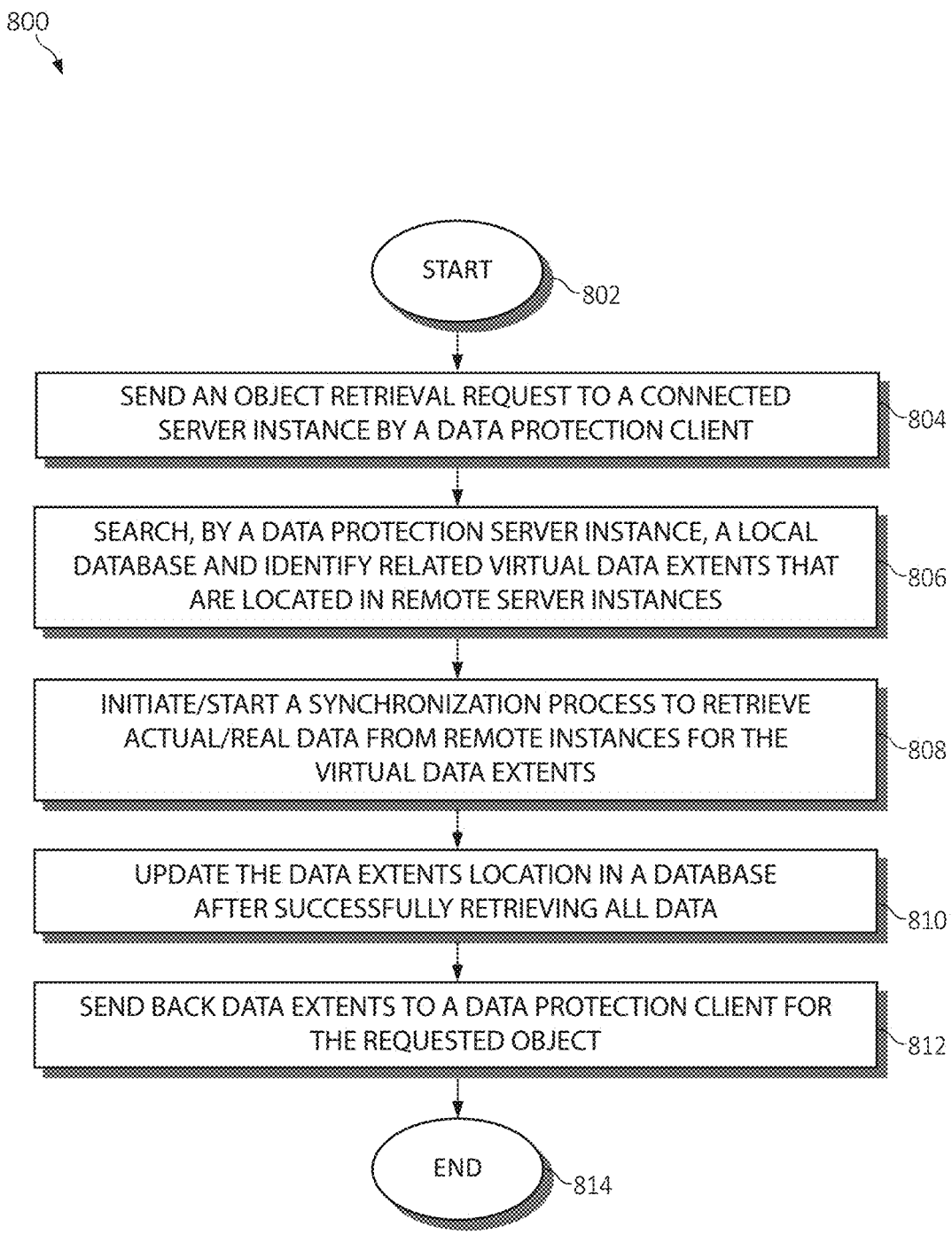
FIG. 8 is a flowchart diagram depicting an exemplary method for retrieving data before a data synchronization operation by one or more processors, again in which aspects of the present invention may be realized.

Turning now to FIG. 8, a method 800 for retrieving data before data synchronization in a computing environment by one or more processors is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

A data protection client may send an object retrieval request to a connected server instance, as in block 804. A data protection server (e.g., a local server instance) instance may search a local database and identify related virtual data extents that are located in remote server instances, as in block 806. The local server instance checks a local database internal to the local server instance and identify which virtual data extents are still located in a remote server instance. For the virtual data extents stored in a remote server instance, a synchronization process may be initiated/started to retrieve the actual/real data from the remote server instances, as in block 808. That is, for each of these virtual data extents, a synchronization process to get the real data back from remote instance.

The data extents location in a database may be updated after successfully retrieving all data, as in block 810. The data extents, for the requested object, may be sent back to data protection client, as in block 812. The functionality 800 may end, as in 814.

Figure 9:
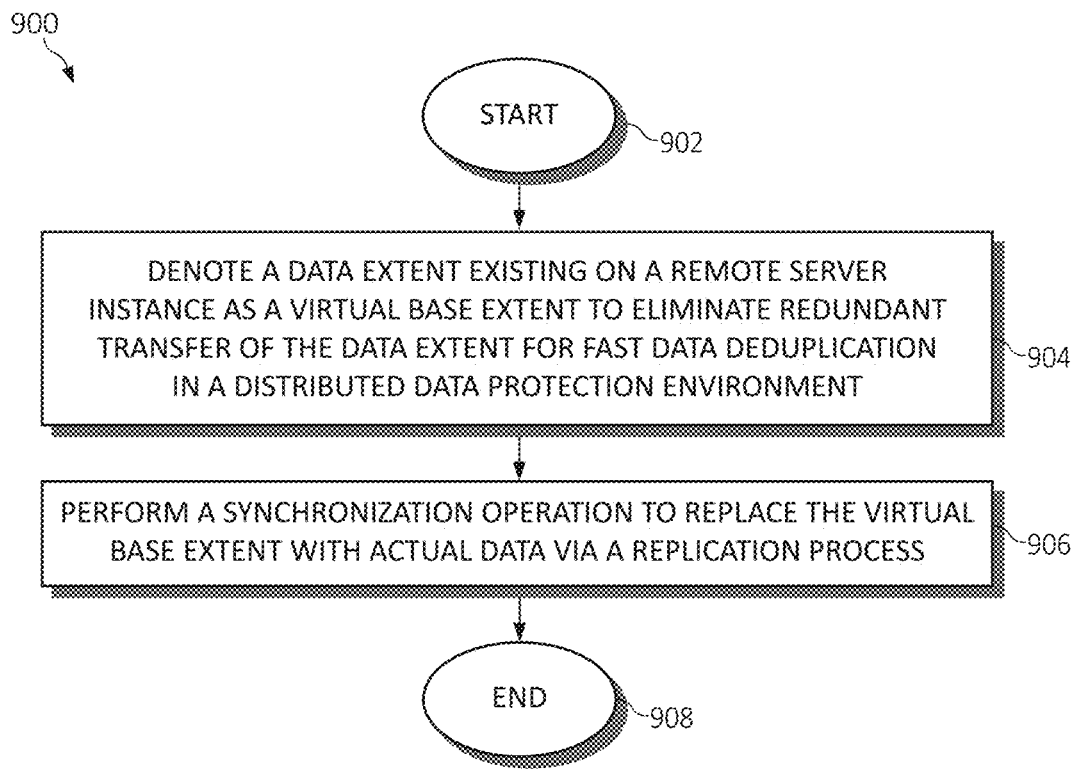
FIG. 9 is a flowchart diagram depicting an exemplary method for fast data deduplication in distributed data protection environment by one or more processors, again in which aspects of the present invention may be realized.

Turning now to FIG. 9, a method 900 for optimizing sequential write operations in a data deduplication and/or data mirroring environment by one or more processors is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 900 may start in block 902.

A data extent, existing on a remote server instance, may be denoted as a virtual base extent to eliminate redundant transfer of the data extent for fast data deduplication in a distributed data protection environment, as in block 904. A synchronization operation is performed to replace the virtual base extent with actual data via a replication process, as in block 906. The functionality 900 may end, as in block 908.

In one aspect, in conjunction with and/or as part of at least one block of FIG. 9, the operations of method 900 may include each of the following. The operations of method 900 may search both a local server instance while querying the remote server instance for locating the data extent, and/or determine the data extent exists on the remote server instance while absent from a local server instance.

The operations of method 900 may denote the data extent as the virtual base extent upon determining the data extent fails to exist on the local server instance while existing on the remote server instance. The operations of method 900 may create a tracking table for tracking an origin of the virtual base extent. A synchronization operation may be performed to replace the virtual base extent with actual data via a replication process. The operations of method 900 may send actual data from the remote server instance to a local server instance according to a list of virtual base extents having a SHA for each virtual base extents.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for data deduplication by one or more processors, comprising:
   denoting a data extent existing on a remote server instance as a virtual base extent to eliminate redundant transfer of the data extent for fast data deduplication in a distributed data protection environment, wherein the data extent is denoted as the virtual base extent upon determining the data extent fails to exist on a local server instance while existing on the remote server instance, and wherein, upon determining the data extent is denoted as the virtual base extent, the data extent is withheld from being backed up from a client to the local server instance during a routine backup operation.

2. The method of claim 1, further including searching both the local server instance while querying the remote server instance for locating the data extent.

3. The method of claim 1, further including creating a tracking table for tracking an origin of the virtual base extent.

4. The method of claim 1, further including performing synchronization operation to replace the virtual base extent with actual data via a replication process.

5. The method of claim 1, further including sending actual data from the remote server instance to the local server instance according to a list of virtual base extents having a secure hash algorithm (SHA) for each virtual base extents.

6. A system for data deduplication in a data deduplication environment, comprising:
   one or more computers with executable instructions that when executed cause the system to:
      denote a data extent existing on a remote server instance as a virtual base extent to eliminate redundant transfer of the data extent for fast data deduplication in a distributed data protection environment, wherein the data extent is denoted as the virtual base extent upon determining the data extent fails to exist on a local server instance while existing on the remote server instance, and wherein, upon determining the data extent is denoted as the virtual base extent, the data extent is withheld from being backed up from a client to the local server instance during a routine backup operation.

7. The system of claim 6, wherein the executable instructions search both the local server instance while querying the remote server instance for locating the data extent.

8. The system of claim 6, wherein the executable instructions create a tracking table for tracking an origin of the virtual base extent.

9. The system of claim 6, wherein the executable instructions performing synchronization operation to replace the virtual base extent with actual data via a replication process.

10. The system of claim 6, wherein the executable instructions send actual data from the remote server instance to the local server instance according to a list of virtual base extents having a secure hash algorithm (SHA) for each virtual base extents.

11. A computer program product for optimizing sequential write operations in a data deduplication environment by one or more processors, the computer program product comprising a non-transitory computer-readable storage medium having computer-readable program code portions stored therein, the computer-readable program code portions comprising:

an executable portion that denote a data extent existing on a remote server instance as a virtual base extent to eliminate redundant transfer of the data extent for fast data deduplication in a distributed data protection environment, wherein the data extent is denoted as the virtual base extent upon determining the data extent fails to exist on a local server instance while existing on the remote server instance, and wherein, upon determining the data extent is denoted as the virtual base extent, the data extent is withheld from being backed up from a client to the local server instance during a routine backup operation.

12. The computer program product of claim 11, further including an executable portion that searches both the local server instance while querying the remote server instance for locating the data extent.

13. The computer program product of claim 11, further including an executable portion that creates a tracking table for tracking an origin of the virtual base extent.

14. The computer program product of claim 11, further including an executable portion that performs synchronization operation to replace the virtual base extent with actual data via a replication process.

15. The computer program product of claim 11, further including an executable portion that sends actual data from the remote server instance to the local server instance according to a list of virtual base extents having a secure hash algorithm (SHA) for each virtual base extents.

* * * * *